US009272903B2

(12) United States Patent
Yang et al.

(10) Patent No.: US 9,272,903 B2
(45) Date of Patent: Mar. 1, 2016

(54) METHOD FOR ELECTRODEPOSITING COPPER NANOPARTICLES

(71) Applicant: NATIONAL CHUNG HSING UNIVERSITY, Taichung (TW)

(72) Inventors: Chia-Jung Yang, Kaohsiung (TW); Fu-Hsing Lu, Taichung (TW)

(73) Assignee: NATIONAL CHUNG HSING UNIVERSITY, Taichung (TW)

( * ) Notice: Subject to any disclaimer, the term of this patent is extended or adjusted under 35 U.S.C. 154(b) by 471 days.

(21) Appl. No.: 13/761,693

(22) Filed: Feb. 7, 2013

(65) Prior Publication Data

US 2014/0138251 A1 May 22, 2014

(51) Int. Cl.
*B82Y 40/00* (2011.01)
*B82Y 30/00* (2011.01)
*C25D 3/38* (2006.01)
*C25D 5/18* (2006.01)
*C25D 17/10* (2006.01)

(52) U.S. Cl.
CPC . *B82Y 30/00* (2013.01); *C25D 3/38* (2013.01); *C25D 5/18* (2013.01); *C25D 17/10* (2013.01); *B82Y 40/00* (2013.01)

(58) Field of Classification Search
CPC ... C25D 3/38–3/40; C25D 5/18; B82Y 30/00; B82Y 40/00
See application file for complete search history.

(56) References Cited

U.S. PATENT DOCUMENTS

| 2006/0191784 | A1* | 8/2006 | Hitzfeld et al. | 204/198 |
| 2007/0272560 | A1* | 11/2007 | Gonzalez et al. | 205/296 |
| 2009/0038952 | A1* | 2/2009 | Tachibana et al. | 205/296 |
| 2009/0294293 | A1* | 12/2009 | Zahraoui et al. | 205/123 |
| 2010/0126872 | A1* | 5/2010 | Paneccasio et al. | 205/123 |
| 2010/0307925 | A1* | 12/2010 | Kondo et al. | 205/103 |
| 2011/0062029 | A1* | 3/2011 | Isono et al. | 205/125 |

OTHER PUBLICATIONS

Zhou et al., Parametric Study on Electrochemical Deposition of Copper Nanoparticles on an Ultrathin Polypyrrole Film Deposited on a Golf Film Electrode, 20 Langmuir 5109 (2004).*
Bozzini et al., Electrodeposition of Cu from Acidic Sulphate Solutions Containing Cetyltrimethylammonium Bromide (CTAB), 38 J. Applied Electrochem., 1561 (2008).*
Huang et al., Substrate surface roughness-dependent 3-D complex nanoarchitectures of gold particles from directed electrodeposition, 19 J. of Mater. Chem. 478 (2009).*

* cited by examiner

*Primary Examiner* — James Lin
*Assistant Examiner* — Ho-Sung Chung
(74) *Attorney, Agent, or Firm* — Muncy, Geissler, Olds & Lowe, P.C.

(57) ABSTRACT

A method for electrodepositing copper nanoparticles includes the steps of a) providing a reaction system having an electrolyte solution, a conductive nitride film used as a working electrode and immersed in the electrolyte solution, a copper metal or a copper alloy used as an auxiliary electrode and immersed in the electrolyte solution, and a reference electrode immersed in the electrolyte solution; and b) applying a pulse voltage to the reaction system to form copper nanoparticles on a surface of the conductive nitride film.

7 Claims, 5 Drawing Sheets

US 9,272,903 B2

METHOD FOR ELECTRODEPOSITING COPPER NANOPARTICLES

BACKGROUND OF THE INVENTION

1. Field of the Invention

The present invention relates generally to a preparation method of nano-metal and more particularly, to a method for electrodepositing copper nanoparticles.

2. Description of the Related Art

Copper nanoparticles are widely used in various kinds of fields. For example, copper nanoparticles can be used in the application field of catalyst, conductive metal ink, or detector material. During the process of preparing copper nanoparticles, it is important to control the surface morphology of the copper nanoparticles such that the copper nanoparticles can have well-defined and homogeneous physical and chemical properties.

A prior art using electrodepositing method to form copper nanoparticles on a conductive polymer was developed and used. However, because the conductive polymer has poor anti-corrosion characteristic, the applicable scope of the aforesaid prior art is limited. Besides, among the electrodepositing methods for forming copper nanoparticles, a method of adjusting pH value or temperature of electrolyte solution was adopted for controlling the surface morphology of copper nanoparticles. However, it is unfriendly to the environment to use acidic, basic or organic solution to adjust pH value of electrolyte solution, and it may waste a lot of energy to adjust temperature of electrolyte solution. Therefore, it is desired to have a method that can well control the surface morphology of copper nanoparticles but has no disadvantages mentioned above.

SUMMARY OF THE INVENTION

It is therefore one objective of the present invention to provide a preparation method of copper nanoparticles, which has widely applicable scope.

It is another objective of the present invention to provide a preparation method of copper nanoparticles, which can control the surface morphology of copper nanoparticles without adjusting pH value or temperature of electrolyte solution.

In order to achieve the aforesaid objectives, the method for electrodepositing copper nanoparticles of the present invention includes the steps of:

a) providing a reaction system having an electrolyte solution, a conductive nitride film used as a working electrode and immersed in the electrolyte solution, a copper metal or a copper alloy used as an auxiliary electrode and immersed in the electrolyte solution, and a reference electrode immersed in the electrolyte solution; and b) applying pulse voltage to the reaction system to form copper nanoparticles on a surface of the conductive nitride film.

Because the surface morphology and directionality of the conductive nitride film used as the working electrode of the present invention can be adjusted and the conductive nitride film has a superior anti-corrosion characteristic, the working electrode of the present invention has widely applicable scope than a general electrode. In comparison with the prior electrodepositing methods, which should be proceeded in acidic, basic or organic electrolyte solution for controlling the surface morphology of copper nanoparticles, the electrodepositing method provided by the present invention can be proceeded at room temperature and in neutral electrolyte solution to form copper nanoparticles having different surface morphology on the surface of the conductive nitride film having different surface roughness. Therefore, the electrodepositing method of the present invention is more friendly to the environment.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

The present invention provides a method for electrodepositing copper nanoparticles. A method in accordance with a preferred embodiment of the present invention includes the following steps.

Figure 1:
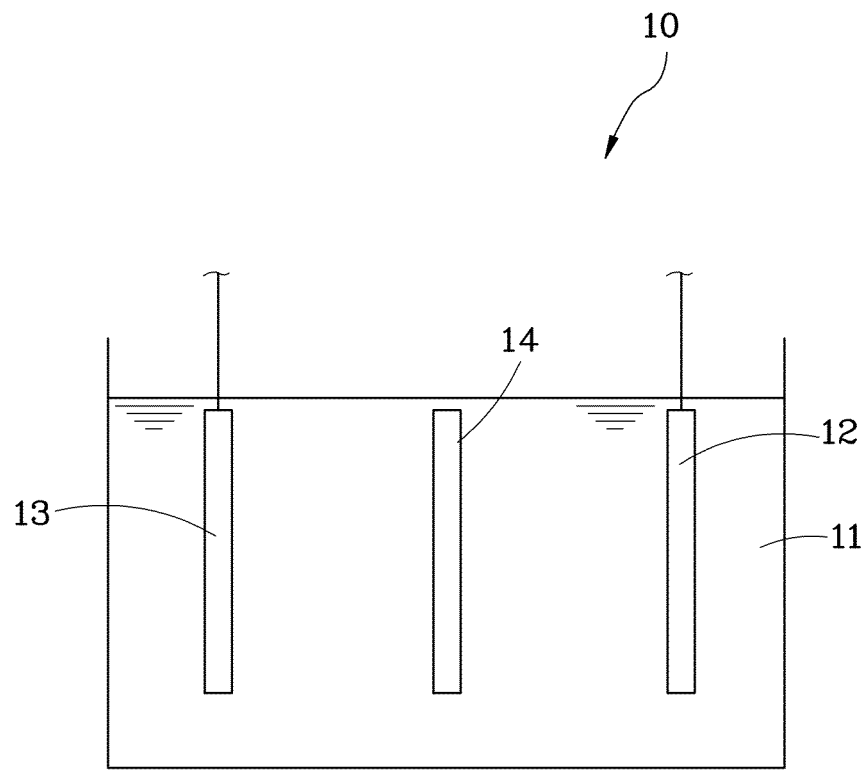
FIG. 1 is a schematic diagram showing a reaction system for performing the method of the present invention.

(a) Provide a reaction system 10 as shown in FIG. 1. The reaction system 10 comprises an electrolyte solution 11, a working electrode made of conductive nitride film 12 and immersed in the electrolyte solution 11, an auxiliary electrode made of copper metal 13 or a copper alloy and immersed in the electrolyte solution 11, and a reference electrode 14 immersed in the electrolyte solution 11.

(b) Apply pulse voltage to the reaction system 10 at room temperature to form copper nanoparticles on a surface of the conductive nitride film 12. The total reaction time is between 2 to 300 seconds.

In order to maintain the concentration of the copper ion in the electrolyte solution 11, the auxiliary electrode is preferably made of copper metal 13. In a short-term electroplating, an auxiliary electrode made of a copper alloy can be used, which may not extensively reduce the quality and production efficiency of the product obtained from the electroplating. The electrolyte solution 11 contains copper sulfate with a concentration ranging from $10^{-1}$ M to $10^{-3}$ M as electrolyte and cetyltrimethyl ammonium bromide (CTAB) with a concentration ranging from $10^{-2}$ M to $10^{-4}$ M as surfactant, and may be a neutral, weak acidic or weak basic aqueous solution. The conductive nitride film 12 may be made of titanium nitride (TiN), zirconium nitride (ZrN), chromium nitride (CrN) or tungsten nitride (WN). The conductive nitride film 12 may be previously formed on a substrate through vacuum sputtering, sintering, spray coating, immersion, adhesion, or electroplating. The auxiliary electrode, i.e. the copper metal 13, may have a shape like plate, sheet, or rod. The reference electrode 14 may be, but not limited to, a silver wire coated with silver chloride, which is represented by silver/silver chloride in the present invention.

[First Embodiment]

Figure 2:
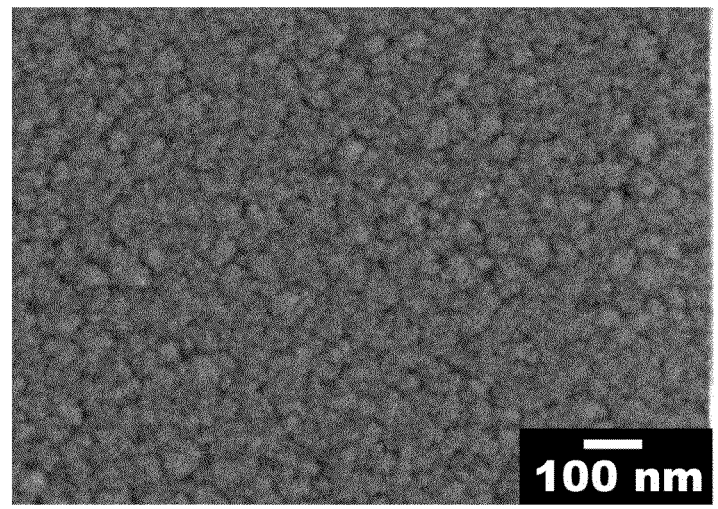
FIG. 2 is a SEM micrograph of titanium nitride film used in the first embodiment of the present invention, showing the surface morphology thereof.

In the first reaction system of the present invention, the electrolyte solution is a neutral aqueous solution containing $10^{-2}$ M copper sulfate and $10^{-3}$ M CTAB, the working electrode is a flat granular titanium nitride film with a surface average roughness (i.e. center line average roughness in the present invention) of 2.2±4 nm as shown in FIG. 2, the auxiliary electrode is copper sheet, and the reference electrode is silver/silver chloride. Pulse voltages of −0.8 V and 0 V are alternately applied to the first reaction system at room temperature by potentiostat. Each pulse voltage is applied to the reaction system for 1 second and the total reaction time is 30 seconds. As such, copper nanoparticles can be formed on the titanium nitride film. The current flows between the working electrode and the auxiliary electrode, and the above-mentioned voltage value is defined as the voltage difference between the working electrode and the reference electrode.

Figure 3:
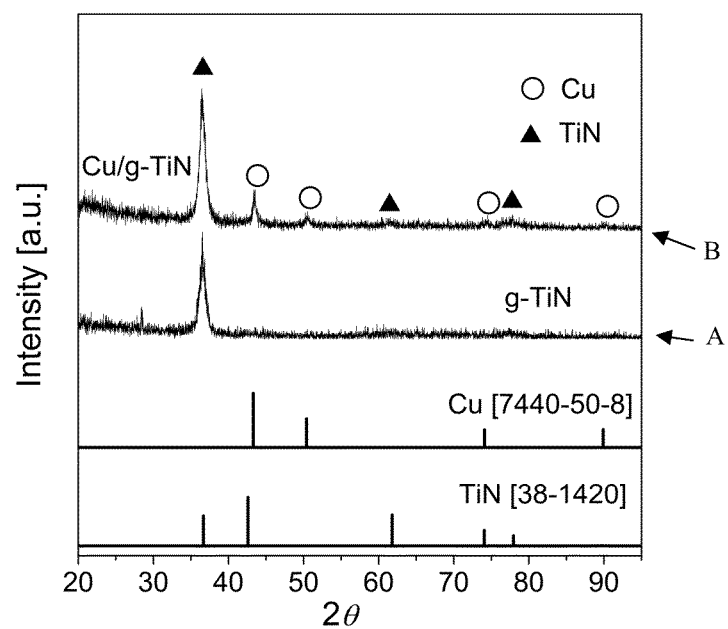
FIG. 3 is X-ray diffraction patterns of titanium nitride film before and after the electrodeposition according to the method of the first embodiment of the present invention.
Figure 4:
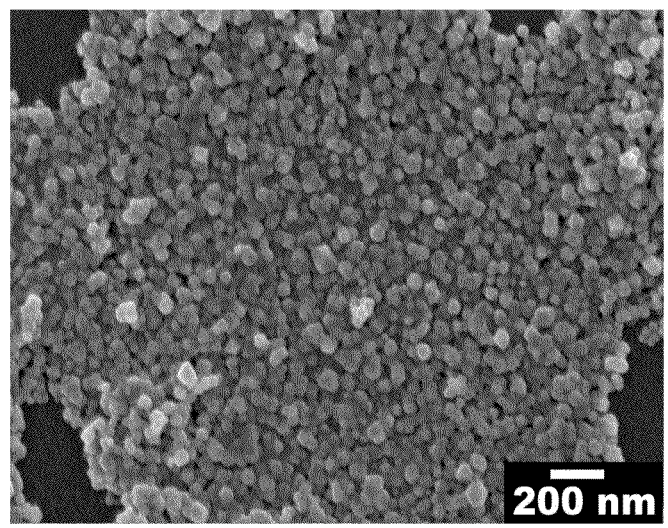
FIG. 4 is a first SEM micrograph of copper nanoparticles formed in accordance with the first embodiment of the present invention, showing the surface morphology thereof.
Figure 5:
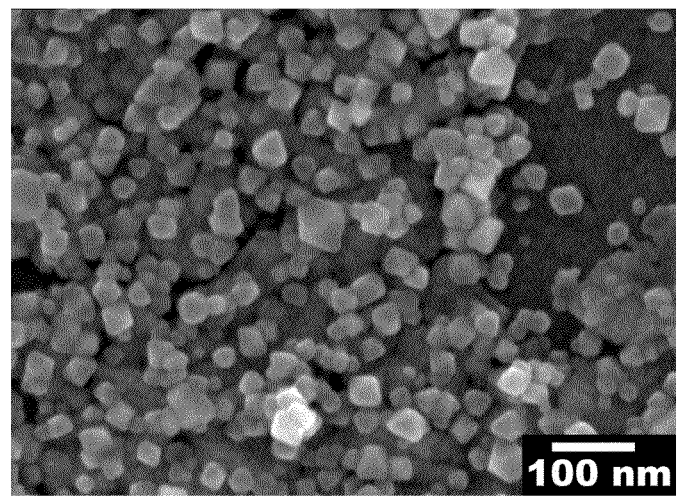
FIG. 5 is a second SEM micrograph of copper nanoparticles formed in accordance with the first embodiment of the present invention, showing the surface morphology thereof.

The titanium nitride film before and after the electrodeposition were analyzed by an X-ray diffractometer (XRD) and the resultant X-ray diffraction spectra are shown in FIG. 3. The pattern A shown in FIG. 3 is the flat granular titanium nitride film and the pattern B is the titanium nitride film after electrodeposition. Compared with the patterns A and B, it was confirmed that the copper metal was deposited on the surface of the titanium nitride film. Besides, as shown in FIGS. 4 and 5 obtained by Field Emission Scanning Electron Microscopy (FE-SEM), it was also confirmed that the copper metal deposited on the titanium nitride film is nano-scale, that is, the copper metal deposited on the titanium nitride film is copper nanoparticle.

[Second Embodiment]

Figure 6:
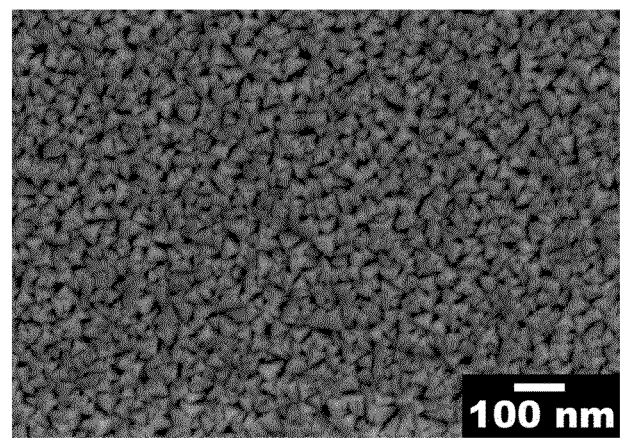
FIG. 6 is a SEM micrograph of titanium nitride film used in the second embodiment of the present invention, showing the surface morphology thereof.

In the second reaction system of the present invention, the electrolyte solution is a neutral aqueous solution containing $10^{-2}$ M copper sulfate and $10^{-3}$ M CTAB, the working electrode is a rough pyramid-shaped titanium nitride film with a surface average roughness of 5.3±4 nm shown in FIG. 6, the auxiliary electrode is copper sheet, and the reference electrode is silver/silver chloride. Pulse voltages of −0.8 V and 0 V are alternately applied to the first reaction system at room temperature by potentiostat. Each pulse voltage is applied to the reaction system for 1 second and the total reaction time is 30 seconds. As such, copper nanoparticles can be formed on the titanium nitride film. The current flows between the working electrode and the auxiliary electrode, and the above-mentioned voltage value is defined as the voltage difference between the working electrode and the reference electrode.

Figure 7:
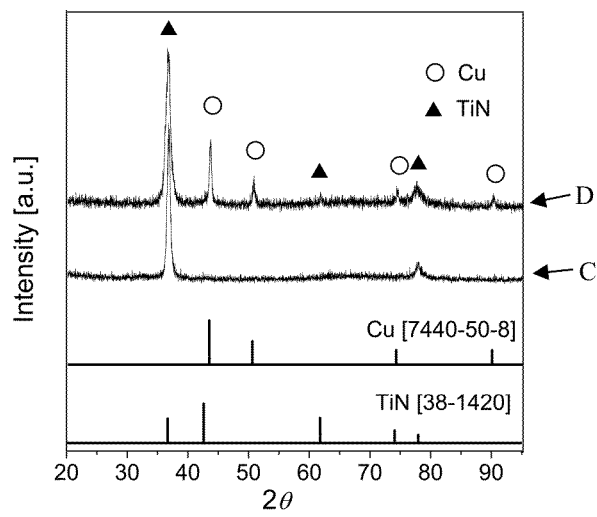
FIG. 7 is X-ray diffraction patterns of titanium nitride film before and after the electrodeposition according to the method of the second embodiment of the present invention.
Figure 8:
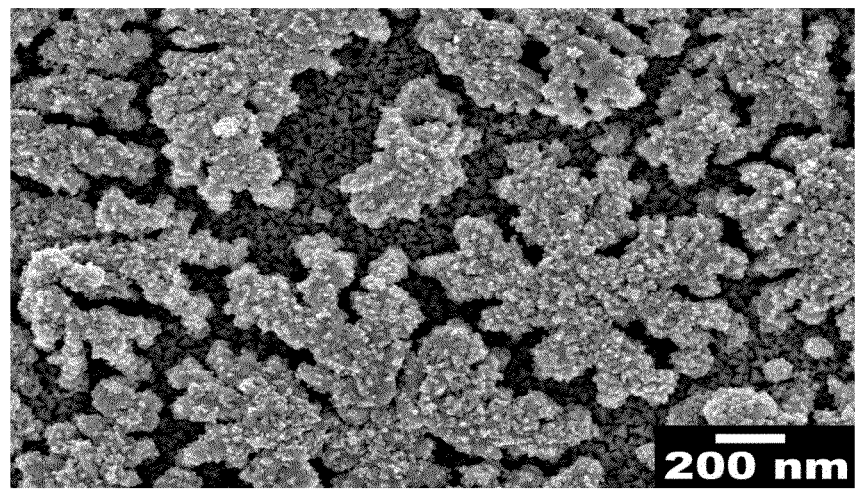
FIG. 8 is a first SEM micrograph of copper nanoparticles formed in accordance with the second embodiment of the present invention, showing the surface morphology thereof.
Figure 9:
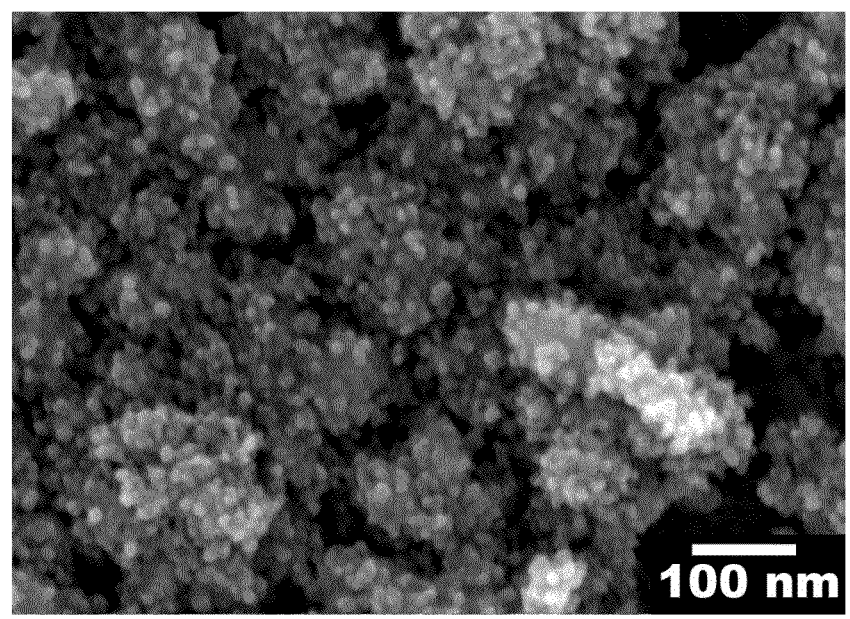
FIG. 9 is a second SEM micrograph of copper nanoparticles formed in accordance with the second embodiment of the present invention, showing the surface morphology thereof.

The titanium nitride film before and after the electrodeposition were analyzed by an X-ray diffractometer (XRD) and the resultant X-ray diffraction spectra are shown in FIG. 7. The pattern C shown in FIG. 7 is the rough pyramid-shaped titanium nitride film and the pattern D is the titanium nitride film after electrodeposition. Compared with the patterns C and D, it was confirmed that the copper metal was deposited on the surface of the titanium nitride film. Besides, as shown in FIGS. 8 and 9 obtained by Field Emission Scanning Electron Microscopy (FE-SEM), it was also confirmed that the copper metal deposited on the titanium nitride film is nano-scale, that is, the copper metal deposited on the titanium nitride film is copper nanoparticle.

As stated above, because the working electrode of the present invention is a conductive nitride film having high adjustable ability on its surface morphology and directionality and a superior anti-corrosion characteristic, the working electrode of the present invention is more applicable than the working electrode made of other material of the prior art. In the prior art, a pH value of an electrolyte solution should be adjusted so as to control the surface morphology of copper nanoparticles forming by an electrodeposition, that is, the reaction should be proceeded in an acidic or a basic solution. However, the inventor of the present invention discovered that copper nanoparticles having different surface morphology, for example the surface morphology of the copper nanoparticles of the first embodiment is octahedron as shown in FIGS. 4-5, and the surface morphology of the copper nanoparticles of the second embodiment is irregular polyhedron as shown in FIGS. 8-9, can be formed by using a conductive nitride film having different surface roughness as a working electrode, and the reaction can be proceeded at room temperature and in a neutral electrolyte solution having a pH value of 7. The copper nanoparticles can be applied in various fields since the copper nanoparticles having different morphology represent different physical and chemical properties.

The difference between the present invention and prior art lies in that the morphology of copper nanoparticles can be changed by proceeding the electrodeposition at room temperature and in a neutral electrolyte solution rather than adjusting pH value or temperature of the electrolyte solution, and the copper nanoparticles having different surface morphology can be formed on a conductive nitride film having different surface roughness. Therefore, it is apparent that the method provided by present invention has an unexpected effect and is more friendly to the environment, and the resultant copper nanoparticles of the present invention can be applied in various fields.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for electrodepositing copper nanoparticles, comprising the steps of:
    (a) providing a reaction system provided with an electrolyte solution, a conductive nitride film used as a working electrode and immersed in said electrolyte solution, a copper metal or a copper alloy used as an auxiliary electrode and immersed in said electrolyte solution, and a reference electrode immersed in said electrolyte solution, the electrolyte solution containing cetyltrimethyl ammonium bromide having a concentration ranging from $10^{-2}$ M to $10^{-4}$ M as surfactant, the conductive nitride film having a flat surface with a center line average roughness ranging from 1.8 to 2.6 nm; and
    (b) applying pulse voltage to the reaction system to form octahedron copper nanoparticles on the surface of said conductive nitride film.

2. The method as claimed in claim 1, wherein said electrolyte solution contains copper sulfate having a concentration ranging from $10^{-1}$ M to $10^{-3}$ M as electrolyte.

3. The method as claimed in claim 1, wherein the step (b) is proceeded at room temperature and the pH value of said electrolyte solution ranges from 6 to 8.

4. The method as claimed in claim 1, wherein said conductive nitride film is titanium nitride film, zirconium nitride film, chromium nitride film or tungsten nitride film.

5. The method as claimed in claim 1, wherein said reference electrode is silver/silver chloride, pulse voltages of −0.8 V and 0 V are alternately applied to said reaction system in step (b) at room temperature, and each said pulse voltage is applied to said reaction system for 1 second.

6. A method for electrodepositing copper nanoparticles, comprising the steps of:
   (a) providing a reaction system provided with an electrolyte solution, a conductive nitride film used as a working electrode and immersed in said electrolyte solution, a copper metal or a copper alloy used as an auxiliary electrode and immersed in said electrolyte solution, and a reference electrode immersed in said electrolyte solution, the electrolyte solution containing cetyltrimethyl ammonium bromide having a concentration ranging from $10^{-2}$ to $10^{-4}$ as surfactant, the conductive nitride film having a surface formed with a plurality of pyramidal protrusions; and
   (b) applying pulse voltage to the reaction system to form copper nanoparticles on the surface of said conductive nitride film.

7. The method as claimed in claim 6, wherein a center line average roughness of said conductive nitride film ranges from 4.9 to 5.7 nm.

* * * * *